US009634865B2

(12) United States Patent
Pattan

(10) Patent No.: US 9,634,865 B2
(45) Date of Patent: Apr. 25, 2017

(54) METHOD OF PROVIDING QUICK ANSWER SERVICE IN SIP MESSAGE SERVICE SYSTEM

(75) Inventor: Basavaraj Jayawant Pattan, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 1539 days.

(21) Appl. No.: 12/095,084

(22) PCT Filed: Nov. 24, 2006

(86) PCT No.: PCT/KR2006/004976
§ 371 (c)(1),
(2), (4) Date: Oct. 14, 2008

(87) PCT Pub. No.: WO2007/061251
PCT Pub. Date: May 31, 2007

(65) Prior Publication Data
US 2009/0222525 A1 Sep. 3, 2009

(30) Foreign Application Priority Data
Nov. 25, 2005 (IN) ............................ 1732/CHE/2005

(51) Int. Cl.
*G06F 15/16* (2006.01)
*H04L 12/58* (2006.01)
(Continued)

(52) U.S. Cl.
CPC ...... *H04L 12/581* (2013.01); *H04L 29/06027* (2013.01); *H04L 51/04* (2013.01);
(Continued)

(58) Field of Classification Search
CPC ....... H04L 51/00; H04L 51/04; H04L 51/046; H04L 65/1006; H04L 65/4007;
(Continued)

(56) References Cited

U.S. PATENT DOCUMENTS 5,894,506 A * 4/1999 Pinter .................. H04L 51/066
379/88.15
6,908,389 B1 * 6/2005 Puskala ........................ 463/40
(Continued)

FOREIGN PATENT DOCUMENTS

WO    WO 03/053083 A2    6/2003
WO    WO 2005/072495 A2    10/2005

OTHER PUBLICATIONS

Int'l Search Report (PCT/ISA/210) 3 pp.
Written Opinion of Int'l Searching Authority (PCT/ISA/237) 4 pp.
PCT/ISA/220 3 pp.

*Primary Examiner* — Nam Tran
(74) *Attorney, Agent, or Firm* — The Farrell Law Firm, P.C.

(57) ABSTRACT

Disclosed is an SIP based message service. If a message service server receives a quick answer addition request from a user terminal, the server detects a quick answer text and a quick answer ID, assigned corresponding to the quick answer text, in the quick answer addition request, and stores the detected quick answer text and quick answer ID in a quick answer list corresponding to the user terminal's user, thereby implementing quick answer addition. Further, if the message service server receives a quick answer sending request from the user terminal, the server detects a quick answer text, corresponding to a user ID contained in the quick answer sending request, in the quick answer list, configures a message containing the detected quick answer text, and sends the configured message to a recipient user terminal, thereby implementing quick answer sending.

22 Claims, 8 Drawing Sheets

(51) Int. Cl.
| | |
|---|---|
| *H04L 29/06* | (2006.01) |
| *H04M 3/42* | (2006.01) |
| *H04M 3/533* | (2006.01) |
| *H04M 7/00* | (2006.01) |
| *H04W 88/18* | (2009.01) |

(52) U.S. Cl.
CPC ...... *H04L 65/1006* (2013.01); *H04L 65/4007* (2013.01); *H04M 3/42382* (2013.01); *H04M 3/53383* (2013.01); *H04M 7/006* (2013.01); *H04W 88/184* (2013.01); *H04L 12/583* (2013.01); *H04L 51/063* (2013.01); *H04M 2201/38* (2013.01); *H04M 2207/18* (2013.01)

(58) Field of Classification Search
CPC ... H04L 12/581; H04M 3/00; H04M 3/42382; H04W 88/184
See application file for complete search history.

(56) References Cited

U.S. PATENT DOCUMENTS

| | | | |
|---|---|---|---|
| 6,956,831 B1 * | 10/2005 | Mahr | H04M 3/5322 370/310 |
| 2003/0126220 A1 * | 7/2003 | Wanless | G06Q 30/02 709/206 |
| 2004/0189699 A1 | 9/2004 | Dobronsky | |
| 2005/0105525 A1 | 5/2005 | Liu | |
| 2007/0036143 A1 * | 2/2007 | Alt | H04L 65/1069 370/352 |

* cited by examiner

METHOD OF PROVIDING QUICK ANSWER SERVICE IN SIP MESSAGE SERVICE SYSTEM

PRIORITY

This application claims priority to Indian Appl. No. 1732/CHE/2005 filed 25 Nov. 2005, and to PCT application number PCT/KR2006/004976 filed 24 Nov. 2006, the entire disclosure of each of which is incorporated herein by reference.

TECHNICAL FIELD

The present invention relates to an SIP (Session Initiation Protocol) based message service, and more particularly to a method for providing a quick answer service in an SIP based message service system.

BACKGROUND ART

Examples of an SIP based message service include Instant Messaging (IM), Push-to-Talk Over Cellular (PoC), Multimedia Messaging (MMS) and so forth. Methods used for sending messages in such an SIP based message service include the following ones.

First, the IETF standard RFC 3428 proposes the MESSAGE method, an extension to the Session Initiation Protocol (SIP) that allows the transfer of Instant Messages. Since an MESSAGE request in the MESSAGE method is an extension to SIP, it inherits all the request routing and security features of that protocol. MESSAGE requests carry the content in the form of MIME body parts. MESSAGE requests do not themselves initiate a SIP dialog. Under normal usage, each Instant Message stands alone, much like pager messages. MESSAGE requests may be sent in the context of a dialog initiated by some other SIP request.

The Message Session Relay Protocol (MSRP) is a protocol for transmitting a series of related instant messages in the context of a session. MSRP is a text-based, connection-oriented protocol for exchanging arbitrary (binary) MIME content, especially instant messages.

The IETF standard RFC 3903 defines a new SIP method, that is, the PUBLISH method, an extension to SIP for publishing event state used within the SIP Events framework. PUBLISH is similar to REGISTER in that it allows a user to create, modify, and remove state in another entity which manages this state on behalf of the user. The PUBLISH request may contain a body, which contains event state that the client wishes to publish. The content format and semantics are dependent on the event package identified in the Event header field.

The IETF standard RFC 3265 defines a new SIP method, that is, the NOTIFY method, an extension to SIP to inform subscribers of changes in state to which the subscriber has a subscription. Subscriptions are typically put in place using the SUBSCRIBE method. However, it is possible that other means have been used.

The IETF standard RFC 3265 defines a new SIP method, that is, the SUBSCRIBE method, an extension to SIP used to request current state and state updates from a remote node. When a subscriber wishes to subscribe to a particular state for a resource, it forms a SUBSCRIBE message. If the initial SUBSCRIBE represents a request outside of a dialog (as it typically will), its construction follows the procedures outlined in SIP RFC 3261 for UAC request generation outside of a dialog. The subscriber can expect to receive a NOTIFY message from each node which has processed a successful subscription or subscription refresh.

The IETF draft standard draft-ietf-simple-xcap-07 defines the Extensible Markup Language (XML) Configuration Access Protocol (XCAP). XCAP allows a client to read, write and modify application configuration data, stored in XML format on a Server. XCAP maps XML document sub-trees and element attributes to HTTP URIs, so that these components can be directly accessed by HTTP. The Client operations allowed by this protocol include Create or Replace a Document, Delete a Document, Fetch a Document, Create or Replace an Element, Delete an Element, Fetch an Element, Create or Replace an Attribute, Delete an Attribute, Fetch an Attribute.

DISCLOSURE OF INVENTION

Technical Problem

The above-mentioned methods provide general message communication, that is, message communication in which if any terminal (a first terminal) receives a message from another terminal (a second terminal), the first terminal presents the received message to a user thereof through a display, and if the user inputs an answer to the received message, the first terminal configures a message corresponding to the user's input and transmits the configured message to the second terminal.

However, these methods fail to provide a service which enables a message service user to configure and store messages, consisting of frequently used phrases, in advance and to perform message communication by using these pre-stored messages whenever necessary during the message communication. Thus, the message service user is inconvenienced in that he/she must always newly configure even frequently used phrases, and thus cannot provide quick answers to received messages.

Therefore, an object of the present invention is to provide a message service method which enables a message service user to easily and conveniently transmit messages consisting of frequently used phrases.

A further object of the present invention is to provide a message service method which enables a message service user to provide quick answers to messages received from communication partners.

Technical Solution

In order to accomplish these objects, the present invention provides a method for providing a quick answer service in a message service system, the method including: a quick answer addition step of, if a message service server receives a quick answer addition request from a user terminal, detecting a quick answer text and a quick answer ID, assigned corresponding to the quick answer text, in the quick answer addition request, and storing the detected quick answer text and quick answer ID in a quick answer list corresponding to the user terminal's user; and a quick answer sending step of, if the message service server receives a quick answer sending request from the user terminal, detecting a quick answer text, corresponding to a user ID contained in the quick answer sending request, in the quick answer list, configuring a message containing the detected quick answer text, and sending the configured message to a recipient user terminal.

Further, the method according to the present invention further includes a quick answer deletion step of, if the message service server receives a quick answer deletion request from the user terminal, detecting a quick answer ID in the quick answer deletion request, and deleting the detected quick answer ID and a quick answer text corresponding thereto from the quick answer list.

Further, the method according to the present invention further includes a quick answer synchronization step of, if the message service server receives a quick answer synchronization request from the user terminal, retrieving the quick answer list, and sending the retrieved quick answer list to the user terminal.

Further, the quick answer addition step includes the steps of: receiving a MESSAGE from the user terminal, the MESSAGE containing a feature tag indicating a quick answer service message, an MIME type indicating that contents related to the quick answer service are contained therein, and a schema field which is defined by the MIME type and contains an operation type set to "Add", the quick answer ID and the quick answer text; checking whether or not a quick answer list corresponding to the user terminal's user exists, and detecting the quick answer list if the quick answer list exists, or creating a new quick answer list corresponding to the user if the quick answer list does not exist; and storing the quick answer ID and the quick answer text, contained in the MESSAGE, in the detected quick answer list or the created new quick answer list.

Further, the quick answer sending step includes the steps of: receiving a MESSAGE from the user terminal, the MESSAGE containing the feature tag, the MIME type, and a schema field which is defined by the MIME type and contains an operation type set to "Send" and a quick answer ID corresponding to a quick answer text to be sent; detecting the quick answer list corresponding to the user terminal's user; detecting the quick answer text, corresponding to the quick answer ID, in the quick answer list; and configuring a message containing the detected quick answer text, and sending the configured message to the recipient user terminal.

Further, the quick answer sending step includes the steps of: receiving an MSRP SEND from the user terminal, the MSRP SEND containing the feature tag, the MIME type, and a schema field which is defined by the MIME type and contains an operation type set to "Send" and a quick answer ID corresponding to a quick answer text to be sent; detecting the quick answer list corresponding to the user terminal's user; detecting the quick answer text corresponding to the quick answer ID in the quick answer list; and configuring a message containing the detected quick answer text, and sending the configured message to the recipient user terminal.

Further, the quick answer deletion step includes the steps of: receiving a MESSAGE from the user terminal, the MESSAGE containing the feature tag, the MIME type, and a schema field which is defined by the MIME type and contains an operation type set to "Delete" and a quick answer ID corresponding to a quick answer text to be deleted; detecting the quick answer list corresponding to the user terminal's user; and deleting the quick answer ID and the quick answer text corresponding thereto from the detected quick answer list.

Further, the quick answer synchronization step includes the steps of: receiving a MESSAGE from the user terminal, the MESSAGE containing the feature tag, the MIME type, and a schema field which is defined by the MIME type and contains an operation type set to "Synchronize"; detecting the quick answer list corresponding to the user terminal's user; and configuring a MESSAGE containing the feature tag, the MIME type and a schema field which is defined by the MIME type and contains an operation type set to "Synchronize" and the quick answer list, and sending the configured MESSAGE to the user terminal.

Further, the quick answer synchronization step includes the steps of: receiving an MSRP SEND from the user terminal, the MSRP SEND containing the feature tag, the MIME type, and a schema field which is defined by the MIME type and contains an operation type set to "Synchronize"; detecting the quick answer list corresponding to the user terminal's user; and configuring an MSRP MESSAGE containing the feature tag, the MIME type and a schema field which is defined by the MIME type and an operation type set to "Synchronize" and the quick answer list, and sending the configured MSRP SEND to the user terminal.

Further, the quick answer addition step includes the steps of: receiving a PUBLISH from the user terminal, the PUBLISH containing an event package indicating a quick answer service message, and a quick answer document which is identified by an MIME type indicating that contents related to the quick answer service are contained therein, and contains the quick answer ID and the quick answer text; checking whether or not a quick answer list corresponding to the user terminal's user exists, and detecting the quick answer list if the quick answer list exists, or creating a new quick answer list corresponding to the user if the quick answer list does not exist; and storing the quick answer ID and the quick answer text, contained in the PUBLISH, in the detected quick answer list or the created new quick answer list.

Further, the quick answer sending step includes the steps of: receiving a MESSAGE from the user terminal, the MESSAGE containing a feature tag indicating a quick answer service message, an MIME type indicating that contents related to the quick answer service are contained therein, and a schema field which is defined by the MIME type and contains an operation type set to "Send" and a quick answer ID corresponding to a quick answer text to be sent; detecting the quick answer list corresponding to the user terminal's user; detecting the quick answer text, corresponding to the quick answer ID, in the quick answer list; and configuring a message containing the detected quick answer text, and sending the configured message to the recipient user terminal.

Further, the quick answer sending step includes the steps of: receiving an MSRP SEND from the user terminal, the MSRP SEND containing a feature tag indicating a quick answer service message, an MIME type indicating that contents related to the quick answer service are contained therein, and a schema field which is defined by the MIME type and contains an operation type set to "Send" and a quick answer ID corresponding to a quick answer text to be sent; detecting the quick answer list corresponding to the user terminal's user; detecting the quick answer text corresponding to the quick answer ID in the quick answer list; and configuring a message containing the detected quick answer text, and sending the configured message to the recipient user terminal.

Further, the quick answer deletion step includes the steps of: receiving a SUBSCRIBE from the user terminal, the SUBSCRIBE containing the event package and a quick answer document which is identified by the MIME type and contains all quick answer IDs stored in the user terminal, except a quick answer ID corresponding to a quick answer text to be deleted; detecting the quick answer list corresponding to the user terminal's user; and deleting the quick answer ID, which does not exist in the quick answer document, and the quick answer text corresponding thereto from the detected quick answer list.

Further, the quick answer synchronization step includes the steps of: receiving a SUBSCRIBE from the user terminal, the SUBSCRIBE containing the event package and a quick answer document which is identified by the MIME; detecting the quick answer list corresponding to the user terminal's user; and configuring a NOTIFY containing the event package, the MIME type and a quick answer document which is identified by the MIME type and contains a quick answer ID and a quick answer text contained in the detected quick answer list, and sending the configured NOTIFY to the user terminal.

Further, the quick answer addition step includes the steps of: receiving an XCAP PUT from the user terminal, the XCAP PUT containing a quick answer document which is identified by an MIME type indicating that contents related to the quick answer service is contained therein, and contains the quick answer ID and the quick answer text; checking whether or not a quick answer list corresponding to the user terminal's user exists, and detecting the quick answer list if the quick answer list exists, or creating a new quick answer list corresponding to the user if the quick answer list does not exist; and storing the quick answer ID and the quick answer text, contained in the XCAP PUT, in the detected quick answer list or the created new quick answer list.

Further, the quick answer sending step includes the steps of: receiving a MESSAGE from the user terminal, the MESSAGE containing a feature tag indicating a quick answer service message, an MIME type indicating that contents related to the quick answer service are contained therein, and a schema field which is defined by the MIME type and contains an operation type set to "Send" and a quick answer ID corresponding to a quick answer text to be sent; detecting the quick answer list corresponding to the user terminal's user; detecting the quick answer text, corresponding to the quick answer ID, in the quick answer list; and configuring a message containing the detected quick answer text, and sending the configured message to the recipient user terminal.

Further, the quick answer sending step includes the steps of: receiving an MSRP SEND from the user terminal, the MSRP SEND containing a feature tag indicating a quick answer service message, an MIME type indicating that contents related to the quick answer service are contained therein, and a schema field which is defined by the MIME type and contains an operation type set to "Send" and a quick answer ID corresponding to a quick answer text to be sent; detecting the quick answer list corresponding to the user terminal's user; detecting the quick answer text corresponding to the quick answer ID in the quick answer list; and configuring a message containing the detected quick answer text, and sending the configured message to the recipient user terminal.

Further, the quick answer deletion step includes the steps of: receiving an XCAP PUT from the user terminal, the XCAP PUT containing a quick answer document which is identified by the MIME type and contains all quick answer IDs stored in the user terminal, except a quick answer ID corresponding to a quick answer text to be deleted; detecting the quick answer list corresponding to the user terminal's user; and deleting the quick answer ID, which does not exist in the quick answer document, and the quick answer text corresponding thereto from the detected quick answer list.

Further, the quick answer synchronization step includes the steps of: receiving an XCAP GET from the user terminal, the XCAP GET containing a quick answer document which is identified by the MIME; detecting the quick answer list corresponding to the user terminal's user; and containing a quick answer ID and a quick answer text, contained in the detected quick answer list, in a 200 OK, and sending the 200 OK to the user terminal.

The present invention provides an extension to an SIP MESSAGE method to support Quick Answer operations like "Add", "Delete", "Send" and "Synchronize". Further, the present invention provides an extension to an MSRP SEND method to support a Quick Answer operation "Send". Further, the present invention provides an extension to an SIP PUBLISH method to support Quick Answer operations like "Add" and "Delete". Further, the present invention provides an extension to an SIP SUBSCRIBE method to support a Quick Answer operation "Synchronize". Further, the present invention provides an extension to an SIP NOTIFY method to support a Quick Answer operation "Synchronize". Further, the present invention provides an extension to XCAP methods to support Quick Answer operations like "Add", "Delete", "Send" and "Synchronize".

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
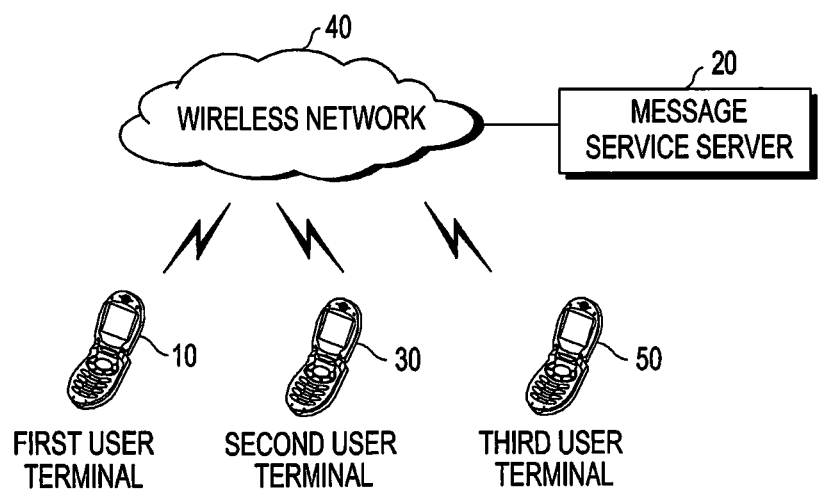
FIG. 1 is a view illustrating the architecture of a message service system to which the present invention is applied.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

For many SIP based message services, there are some messages which a message service user usually uses as answers to any message contents. If the user can preset and store these messages in advance before he/she starts a conversation, he/she can quickly send messages and reduce the number of times of user inputs during the conversation by sending these pre-configured messages as an answer. The present invention provides such a message service (so-called a quick answer service), and quick answer messages corresponding to the pre-configured messages are stored on a message service server according to the present invention.

More specifically, the present invention provides a quick answer service system and method that allows a user to store predefined text messages corresponding to unique IDs. By using the system and method disclosed in the present invention, a user can simply send a predefined text message by using only a unique ID corresponding thereto, and that text message is sent to a recipient (another user). Thus, in the present invention, the user has the capability of adding or deleting quick answer messaged containing unique IDs corresponding to the predefined text messages. These quick answer messages may be stored on a message service server, and thus whenever the user logs in through a new different client, the pre-stored messages are synchronized with the new client, thereby allowing the user to access and use the pre-stored quick answer messages through many different clients/devices.

The present invention may be implemented according to three different embodiments. A first embodiment is implemented using SIP MESSAGE and SIP MSRP SEND methods, a second embodiment is implemented using SIP PUBLISH, SIP SUBSCRIBE and SIP NOTIFY methods, and a third embodiment is implemented using XCAP GET and PUT methods.

Firstly, in order to implement a quick answer service by using the SIP MESSAGE and/or SIP MSRP SEND methods according to the first embodiment of the present invention, the present invention introduces a new feature tag. This new feature tag can indicate if a client supports the quick answer service or not, and also helps both sending and receiving systems to uniquely identify a quick answer message. The new feature tag can be called as say "+goma.qamsg". Further, a new MIME type, for example, "application/vnd.qamsg+xml", may be contained in a schema, such that it is possible to identify that an SIP method message body contains a quick answer. Further, in order to discriminate various quick answer service-related operations, schema fields in the quick answer message contain an operation type, a quick answer ID and a quick answer text. The operation type indicates whether a quick answer is for an Add operation, a Delete operation, a Send operation or a Synchronize operation. The quick answer ID corresponds to each quick answer text, that is, each quick answer message, and is used for identifying quick answer messages. The quick answer text is a free text, contains substantial message contents constituting a quick answer message, for example, phrases such as "Hi!", and is contained in the schema field only for an Add operation. Accordingly, the first embodiment of the present invention provides an extension to the SIP MESSAGE method, and thus can provide a quick answer service to support quick answer operations like Add, Delete, Send and Synchronize.

Secondly, in order to implement a quick answer service by using SIP PUBLISH, SIP SUBSCRIBE and SIP NOTIFY methods according to the second embodiment of the present invention, the present invention introduces a new event package, for example, "quick-answers", and further introduces a new MIME type, for example, "application/vnd.qamsg+xml", which has a root element tag as <quick answers> consisting of element <qatext> containing an "id" attribute. A new quick answer document cab be identified by this new MIME type. Accordingly, the second embodiment of the present invention provides an extension to the SIP PUBLISH method to support quick answer operations like Add and Delete, and provides an extension to the SIP SUBSCRIBE or SIP NOTIFY method to support quick answer operation Synchronize. Further, the second embodiment of the present invention provides an extension to the SIP MESSAGE method to support a quick answer Send operation.

Thirdly, in order to implement a quick answer service by using XCAP GET and PUT methods according to the third embodiment of the present invention, the present invention configures a new quick answer document identified by a new MIME type, for example, "application/xcap.qamsg+xml", which has a root element tag as <quick answers> consisting of element <qatext> containing an "id" attribute. Accordingly, the present invention can provide an extension to the XCAP methods to support quick answer operations like Add, Delete, Send and Synchronize.

Reference will now be made in detail to the above-mentioned embodiments of the present invention, with reference to the accompanying drawings.

FIG. 1 illustrates the architecture of a messaging system to which the present invention is applied. Referring to FIG. 1, the messaging system includes a plurality of user terminals 10, 30, a message service server 20 and a wireless network 40.

Each of the plurality of user terminals, including a first user terminal 10 and a second user terminal 30, includes a client necessary for message communication, and accesses the message service server 20 through the wireless network 40. Further, each user terminal supports a quick answer service according to the present invention. That is, each user terminal 10, 30 compose quick answer texts, which constitute the substantial contents of quick answers, according to user inputs, configures a quick answer message by assigning a quick answer ID to the quick answer text, and stores the configured quick answer message therein. Further, each user terminal 10, 30 requests quick answer addition by sending the quick answer message to the message service server 20. Furthermore, for any quick answer message, each user terminal 10, 30 sends a quick answer deletion request and a quick answer sending request, destined for other user terminals, to the message service server. With respect to this, a quick answer ID corresponding to the relevant quick answer message is contained in each request. Further, each user terminal 10, 30 can request quick answer synchronization by accessing the message service server 20 and requesting quick answer messages stored therein according to users.

The message service server 30 is a server for providing various SIP based message services, and supports the quick answer service according to the present invention. Thus, if the message service server 20 receives a quick answer addition request from the user terminal 10 or 30, it checks if a quick answer list corresponding to the relevant user exists. Subsequently, if the quick answer list corresponding to the user does not exist, the message service server 20 creates a new quick answer list, and adds a quick answer message, carried in the quick answer addition request, to the created quick answer list. If the quick answer list corresponding to the user exists, the message service server 20 adds a quick answer message, carried in the quick answer addition request, to the quick answer list. Further, if the message service server 20 receives a quick answer sending request from the user terminal 10 or 30, it retrieves a quick answer message corresponding to a quick answer ID contained in the quick answer sending request. Subsequently, the message service server 20 detects a quick answer text in the corresponding quick answer message, configures a sending message containing the detected quick answer text, and sends the configured message to a recipient user terminal. Further, if the message service server 20 receives a quick answer deletion request form the user terminal 10 or 30, it retrieves a quick answer message corresponding to a quick answer ID contained in the quick answer deletion request, and deletes the retrieved quick answer message. Further, if the message service server 20 receives a quick answer synchronization request from the user terminal 10 or 30, it retrieves a quick answer list stored corresponding to the relevant user, and sends the retrieved quick answer list to the relevant user terminal 10 or 30.

In the so-constructed messaging system, the quick answer service according to the present invention may be implemented pursuant to the above-mentioned first, second and third embodiments. Hereinafter, quick answer service implementations according to the respective embodiments will be described in detail with reference to FIGS. 2 to 17. Reference will first be made to a quick answer service that is implemented through SIP MESSAGE and SIP MSRP SEND methods according to the first embodiment of the present invention.

The first embodiment of the present invention proposes a method of adding a new feature tag and a new MIME body format to the existing SIP framework, and carrying new contents in the new MIME body format, in order to send information for a quick answer service and receive a user response thereto. Messages used for this method could be for example a MESSAGE or an MSRP SEND.

Irrespective of whether or not a quick answer message is sent within a session, the SIP MESSAGE method may be used for sending and receiving a quick answer message. The MSRP SEND method may also be used for sending a quick answer message during the set-up session. A quick answer service has to be supported by both a client and a server. Further, quick answer messages have to be uniquely identified by the client and server, such that they are distinguished from the other normal messages. Introducing the new feature tag can help the server to know if the client supports a quick answer service, and also for both the sending and receiving systems to uniquely identify a quick answers message. The new feature tag can be called as say "+goma.qamsg". Such a new feature tag is applicable to any service, for example, IM, PoC and MMS services. The new feature tag has to be registered by the client during an SIP REGISTER. In order to indicate the support of a quick answer service, the "+goma.qamsg" is contained in an SIP header field, for example, it may be contained in an Accept-Contact header field. The new feature tag must be able to used in various SIP methods for quick answers. The SIP method carries the new feature tag in the header field, for example, in the Accept-Contact header field, along with "require" and "explicit" parameters pursuant to rules and procedures of IETF RFC 3841 "Caller Preferences for the Session Initiation Protocol".

Further, the first embodiment of the present invention defines a new MIME type related to a quick answer service. This new MIME type is uniquely identified, for example, by "application/vnd.qamsg+xml". This MIME type makes it possible to identify that an SIP method body contains a quick answer message, confirming to a particular schema. Such a new MIME type is applicable to any service, for example, IM, PoC and MMS services. The new MIME type has to be indicated in various SIP methods for quick answers, and the SIP methods carrie the new MIME type in the header field, for example, in a Content-Type header field. The new MIME type is carried in the body of various SIP method messages during sending and receiving a quick answer message. The body has to be configured in conformity with a new schema defined by the new MIME type.

Schema fields of a message used in various operations related to a quick answer service may contain an operation type, a quick answer ID and a quick answer text. The operation type indicates which one of Add/Delete/Send/Synchronize operations corres pond to a quick answer service operation which is currently being conducted. The quick answer ID is a unique ID assigned according to users of quick answer messages. The quick answer text is the substantial contents of a quick answer message, and is contained in the schema field only for an Add operation.

Figure 17:
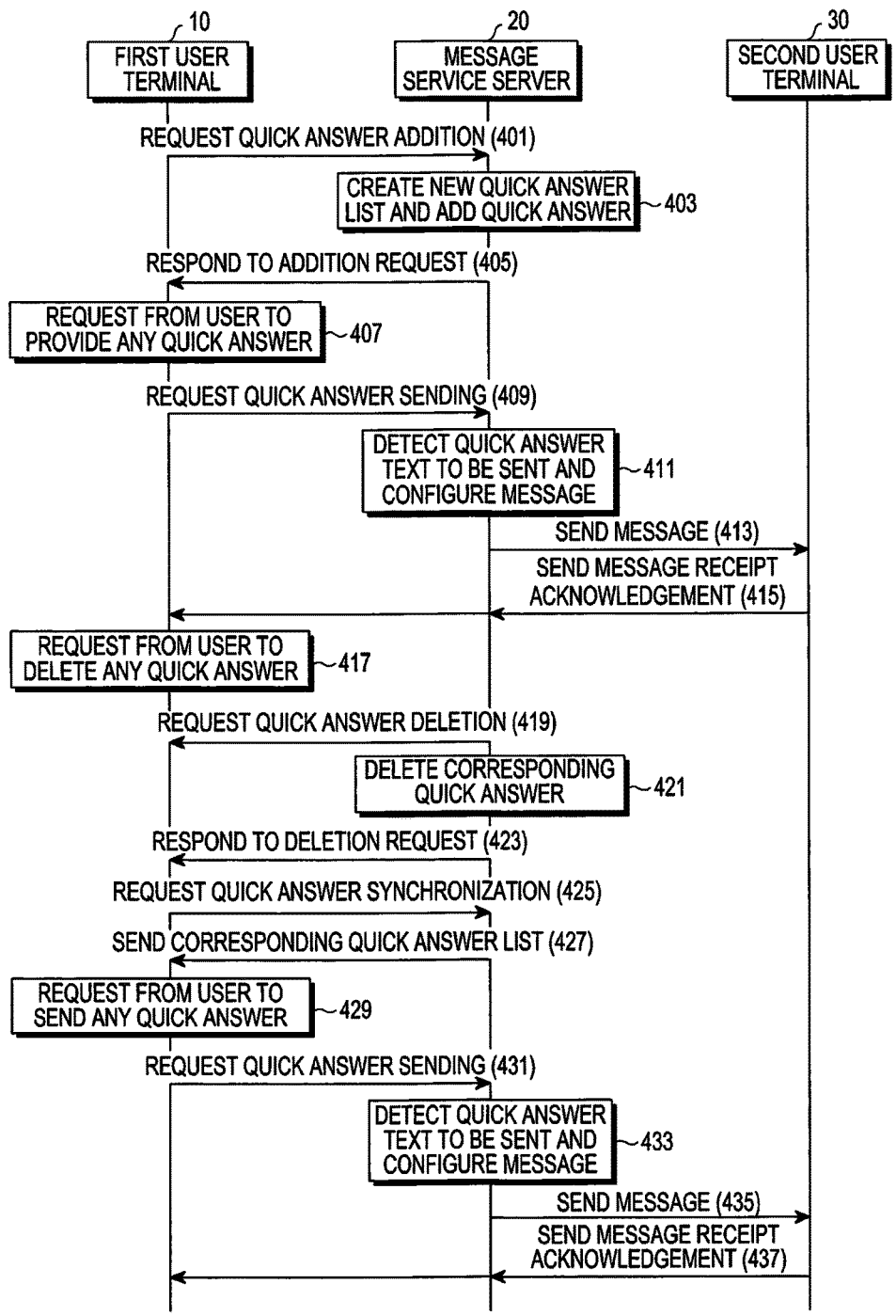
FIG. 17 is a message flowchart illustrating a quick answer service procedure in accordance with a preferred embodiment of the present invention.

Reference will now be made to the first embodiment of the present invention, with reference to FIGS. 2 to 7 and FIG. 17. FIGS. 2 to 7 illustrate the types of messages used corresponding to Add/Delete/Send/Synchronize operations of a quick answer service according to the first embodiment of the present invention, and FIG. 17 illustrates message flows in a quick answer service procedure according to the present invention. Further, in FIG. 17, the user of a first user terminal 10 is the same as that of a second user terminal 30, and the user corresponds to a user illustrated in FIGS. 2 to 7.

Referring to FIG. 17, if the user desires to store a quick answer message, which contains specific phrases as contents thereof, on a message service server 20, he/she draws up the desired message through the first user terminal 10. The first user terminal 10 composes a quick answer text corresponding to a user input, configures a quick answer message by assigning a quick answer ID to the composed quick answer text, and stores the configured a quick answer message.

Subsequently, in step 401, the first user terminal 10 requests quick answer addition by sending the quick answer message to the message service server 20. Here, the user may compose the quick answer text by inputting corresponding phrases in person, but may select one of pre-stored quick answer texts. If the message service server 20 receives the quick answer addition request from the first user terminal 10, it checks in step 403 whether or not a quick answer list corresponding to the user of the first user terminal 10 exists. If the quick answer list exists, the message service server 20 additionally stores the quick answer message, received in step 401, in the relevant quick answer list. However, if the quick answer list does not exist, the message service server 20 creates a new quick answer list, stores the quick answer message, received in step 401, in the created quick answer list, and then proceeds to step 405. In step 405, the message service server 20 responds to the addition request by sending an addition response to the first user terminal 10.

Figure 2:
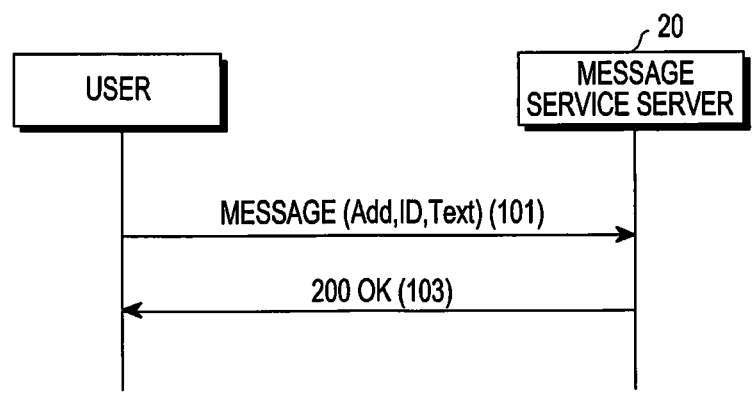
FIG. 2 is a block diagram illustrating a quick answer addition step in accordance with a first preferred embodiment of the present invention.

The first embodiment of the present invention implements the quick answer addition request in step 401 and the response to the addition request in step 405 by using the SIP MESSAGE method, which is illustrated in FIG. 2. In FIG. 2, step 401 corresponds to step 101, and step 405 corresponds to step 103. In step 101, the user sends a MESSAGE, the body of which carries a schema field containing an operation type set to "Add" and a quick answer message, that is, a quick answer ID and a quick answer text, to the message service server 20. In step 103, the message service server 20 operates in the same manner as in step 403, and sends a 200 OK as a user addition response.

Returning to FIG. 17, in step 407, the first user terminal 10 provides a quick answer list containing all quick answer messages which have been stored on the message service server 20 through steps 401 to 405 according to user inputs. Subsequently, if the user selects one quick answer message out of the quick answer list, designates other terminals, for example, designates the second user terminal 30 as a recipient terminal, and inputs a request for sending the selected quick answer message to the designated recipient terminal, the first user terminal 10 proceeds to step 409. In step 409, the first user terminal 10 requests quick answer sending by sending a quick answer ID, contained in the quick answer message selected in step 407 by the user, to the message service server 20. If, in step 409, the message service server 20 receives the quick answer sending request along with the quick answer ID from the first user terminal 10, in step 411, it retrieves a quick answer message corresponding to the quick answer ID and detects a quick answer text in a corresponding quick answer message. Further, the message service server 20 configures a message containing the detected quick answer text, and sends the configured message to the second user terminal 30 in step 413. If, in step 413, the second user terminal 30 receives the message, in step 415, it sends an acknowledgement for the receipt of the message to the message service server 20, and the message service server sends back the message receipt acknowledgement to the first user terminal 10.

Figure 4:
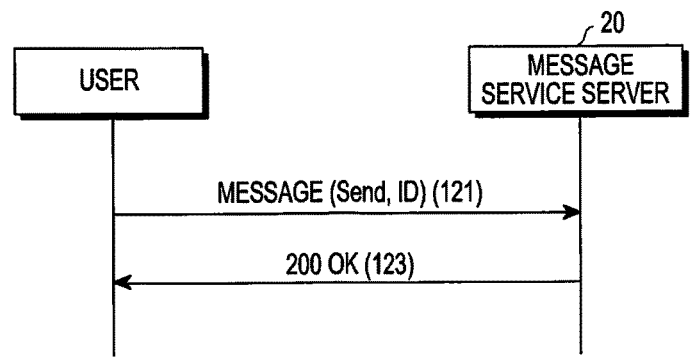
FIG. 4 is a block diagram illustrating a quick answer sending step using a MESSAGE in accordance with the first embodiment of the present invention.
Figure 5:
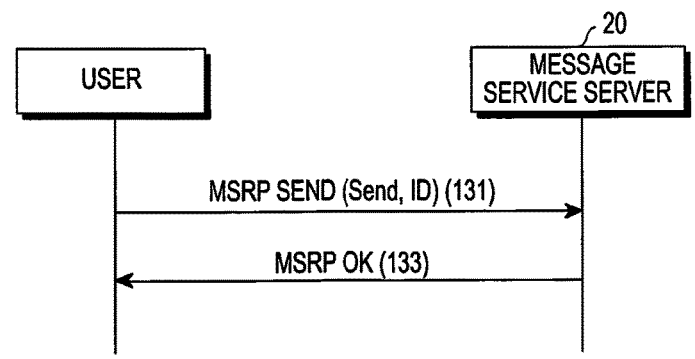
FIG. 5 is a block diagram illustrating a quick answer sending step using an MSRP SEND in accordance with the first embodiment of the present invention.

The first embodiment of the present invention implements this sending of a quick answer message by using the SIP MESSAGE or MSRP SEND methods. In FIGS. 4 and 5, steps 121 and 131 correspond to step 409. Referring to FIG. 4, in step 121, the user sends a MESSAGE, the body of which carries a schema field containing an operation type set to "Send" and a quick answer ID corresponding to a quick answer message to be sent, to the message service server 20. If the message service server 20 receives the MESSAGE, it performs operations corresponding to steps 411 and 413. Further, in step 123, the message service server 20 sends a 200 OK to the user. For the case of using the MSRP SEND, refer to FIG. 5. In step 131, the user sends an MSRP SEND, the body of which carries a schema field containing an operation type set to "Send" and a quick answer ID corresponding to a quick answer message to be sent, to the message service server 20. If the message service server 20 receives the MSRP SEND, it performs operations corresponding to steps 411 and 413. Further, in step 133, the message service server 20 sends a 200 OK to the user.

In addition, the user may want to delete a quick answer message stored on the message service server 20. Returning to FIG. 17, if, in step 417, the user inputs a request for deleting any quick answer message, the first user terminal 10 proceeds to step 419. In step 419, the first user terminal 10 requests quick answer deletion by sending a quick answer ID, corresponding to a user-selected quick answer message to be deleted message, to the message service server 20. If the message service server 20 receives the quick answer deletion request, in step 421, it retrieves and deletes a quick answer message corresponding to the quick answer ID received along with the quick answer deletion request. Further, in step 423, the message service server 20 responds to the deletion request by sending a deletion response to the first user terminal 10.

Figure 3:
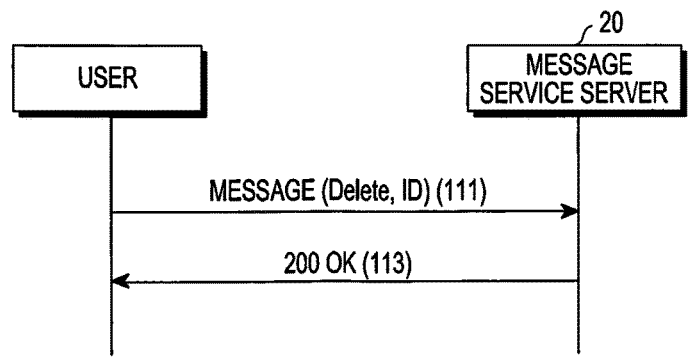
FIG. 3 is a block diagram illustrating a quick answer deletion step in accordance with the first embodiment of the present invention.

The first embodiment of the present invention also implements this deletion of a quick answer message by using the SIP MESSAGE method, which is illustrated in FIG. 3. Referring to FIG. 3, in step 111, the user requests quick answer deletion by sending a MESSAGE, the body of which carries a schema field containing an operation type set to "Delete" and a quick answer ID corresponding to a quick answer message to be deleted, to the message service server 20. The message service server 20 retrieves and deletes a quick answer message corresponding to the quick answer ID contained in the MESSAGE, and in step 113, sends a 200 OK as a response to the deletion request.

Meanwhile, the user of the first user terminal 10 may possess a terminal other than the first user terminal 10, for example, a third user terminal 50. Further, the user may want to manage and send quick answer messages, stored on the message service server 20, through the third user terminal 50. In order to implement such a service, the third user terminal 50 must perform a synchronization operation in which it receives a quick answer list, stored corresponding to the user, from the message service server 20, and stores thereon the received quick answer list. Referring to FIG. 17, in step 425, the third user terminal 50 requests quick answer synchronization to the message service server 20 according to a user input. If the message service server 20 receives the quick answer message synchronization request, it retrieves a quick answer list stored corresponding to the relevant user, that is, the user of the third user terminal 50, and in step 427, sends the retrieved quick answer list to the third user terminal 50. Thereafter, the third user terminal 50 can provide the user with a quick answer list available for the user, and the user can request the message service server 20 to send or delete any quick answer message, with reference to the quick answer list. Steps 429 to 437 correspond to steps 407 to 415, and operations in the respective steps are performed in a similar manner to described above.

Figure 6:
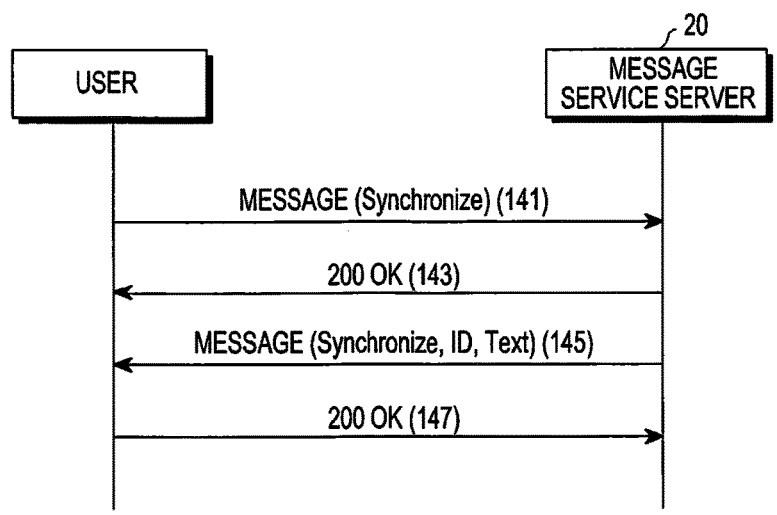
FIG. 6 is a block diagram illustrating a quick answer synchronization step using a MESSAGE in accordance with the first embodiment of the present invention.
Figure 7:
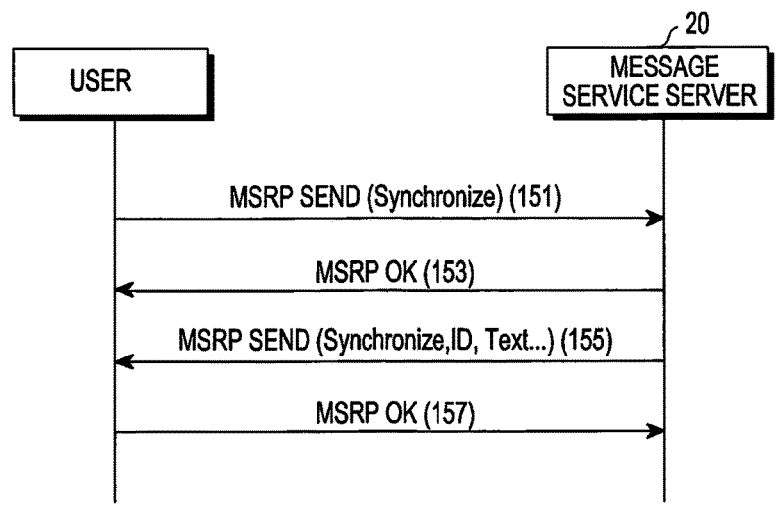
FIG. 7 is a block diagram illustrating a quick answer synchronization step using an MSRP SEND in accordance with the first embodiment of the present invention.

The first embodiment of the present invention implements this synchronization of a quick answer message by using the SIP MESSAGE or MSRP SEND method, as illustrated in FIGS. 6 and 7. In FIGS. 6 and 7, steps 141 and 151 correspond to step 425, and steps 145 and 155 correspond to step 427. Referring to FIG. 6, in step 141, the user sends a MESSAGE, the body of which carries a schema field containing an operation type set to "Synchronize", to the message service server 20. If the message service server 20 receives the MESSAGE, in step 143, it sends a 200 OK as a receipt acknowledgement, and retrieves a quick answer list stored corresponding to the user. Further, in step 145, the message service server 20 sends a MESSAGE, the body of which carries a schema filed containing an operation type set to "Synchronization", a quick answer ID contained in the retrieved quick answer list, and quick answer texts contained in the retrieved quick answer list, to the user. In step 147, the user sends a 200 OK as a receipt acknowledgement to the message service server 20. For the case of using the MSRP SEND, refer to FIG. 7. In step 151, the user sends an MSRP SEND, the body of which carries a schema field containing an operation type set to "Synchronize", to the message service server 20. If the message service server 20 receives the MSRP SEND, in step 153, it sends a 200 OK as a receipt acknowledgement, and retrieves a quick answer list stored corresponding to the user. Further, in step 155, the message service server 20 sends an MSRP SEND, the body of which carries a schema field containing an operation type set to "Synchronization", a quick answer ID contained in the retrieved quick answer list, and quick answer texts contained in the retrieved quick answer list, to the user. In step 157, the user sends a 200 OK as a receipt acknowledgement to the message service server 20.

Next, reference will be made to the second embodiment of the present invention where a quick answer service is implemented using the SIP PUBLISH, SIP SUBSCRIBE and SIP NOTIFY methods.

RFC 3265 defines an SIP extension for subscribing to, and receiving notifications of changes, that is, events, in the state of remote nodes. RFC 3265 defines various events by concrete extensions, known as event packages. The present invention proposes a new event package to support publication, subscription, and notification of a quick answer service. The new event package may be named as "quick-answers". This new event package may be applicable to SIP based services, for example, IM, PoC and MMS services.

As specified in RFC 3265, the event package name value is contained in the Event header field present in SUBSCRIBE and NOTIFY requests. As specified in the RFC 3903, this value is contained as well in the Event header field present in PUBLISH requests. A quick answer document is an XML document that must be well-formed and should be valid. Quick answer documents are identified by the MIME type "application/vnd.qamsg+xml". Further, a quick answers document begins with the root element tag <quick-answers>. This tag <quick answers> consists of zero or more <qatext> elements, each one including an "id" attribute that contains a unique identifier associated with the quick answer text for a user.

Figure 8:
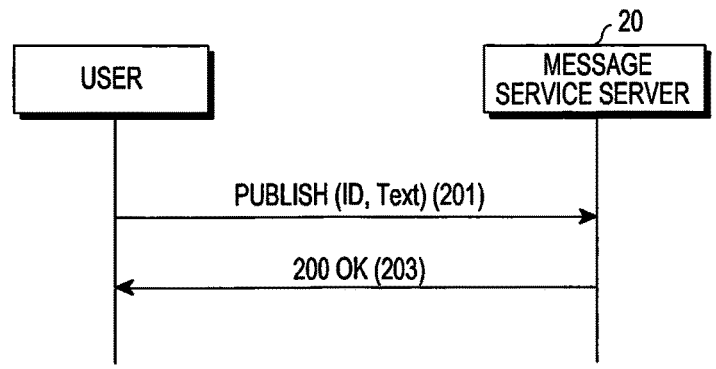
FIG. 8 is a block diagram illustrating a quick answer addition step in accordance with a second preferred embodiment of the present invention.
Figure 9:
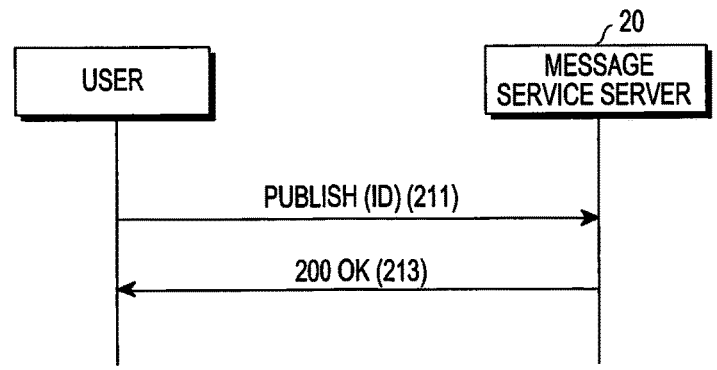
FIG. 9 is a block diagram illustrating a quick answer deletion step in accordance with the second embodiment of the present invention.

As shown in FIGS. 8 and 9, in this new event package, the body of a PUBLISH request contains a quick answer document, and the SIP PUBLISH method uses the body containing a quick answer document, for both Add and Delete operations. Further, there is introduced a new feature tag which helps a server to know if a client supports a quick answer feature and also for both sending and receiving systems to uniquely identify a quick answer message. The new feature tag can be called as say "+goma.qamsg". Further, a new MIME type to identify that the SIP method body contains a quick answer message, for example, "application/vnd.qamsg+xml", is contained in a peculiar schema, and schema fields in a quick answer message used in a Send operation contains a quick answer ID.

Reference will now be made to the second embodiment of the present invention, with reference to FIGS. 8 to 12 and FIG. 17. FIGS. 8 to 12 illustrate the types of messages used corresponding to Add/Delete/Send/Synchronize operations of a quick answer service according to the second embodiment of the present invention.

The second embodiment of the present invention implements the quick answer addition request in step 401 and the response to the addition request in step 405 by using the PUBLISH method, which is illustrated in FIG. 8. In FIG. 8, step 201 corresponds to step 401, and step 203 corresponds to step 405. In step 201, the user sends a PUBLISH, the body of which carries a quick answer document containing a quick answer message, that is, a quick answer ID and a quick answer text, to the message service server 20. Here, the user terminal stores thereon the quick answer document. In step 203, the message service server 20 operates in the same manner as in step 403, and sends a 200 OK as a user addition response.

Figure 10:
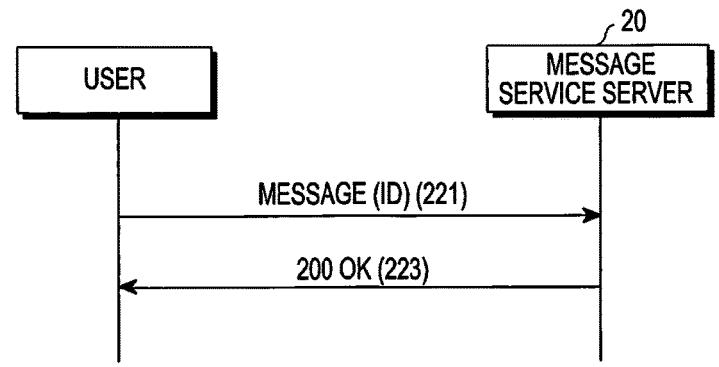
FIG. 10 is a block diagram illustrating a quick answer sending step using a MESSAGE in accordance with the second embodiment of the present invention.
Figure 11:
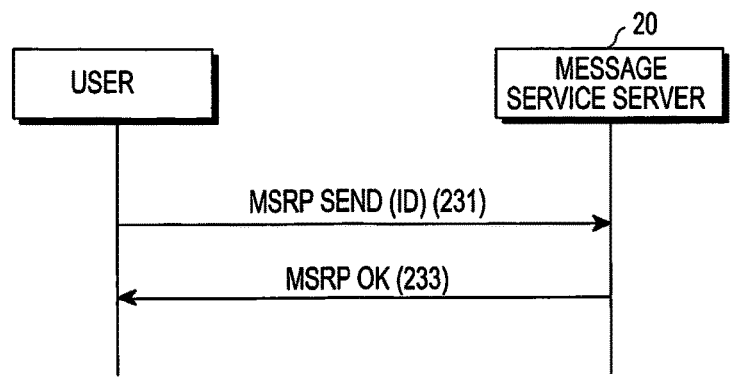
FIG. 11 is a block diagram illustrating a quick answer sending step using an MSRP SEND in accordance with the second embodiment of the present invention.

If a quick answer list is stored on the message service server 20, the user can this quick answer list in message communication. Thus, in order that the user requests the message service server 20 to send a quick answer message, as in step 409, the second embodiment of the present invention uses the MESSAGE or MSRP SEND method, as illustrated in FIG. 10 or 11. In FIG. 10 or 11, steps 221 and 231 correspond to step 409. Referring to FIG. 10, in step 221, the user sends a MESSAGE, the body of which carries a schema field containing a quick answer ID corresponding to a quick answer message to be sent, to the message service server 20. If the message service server 20 receives the MESSAGE, it performs operations corresponding to steps 411 and 413. Further, in step 223, the message service server 20 sends a 200 OK to the user. For the case of using the MSRP SEND, refer to FIG. 11. In step 231, the user sends an MSRP SEND, the body of which carries a schema field containing a quick answer ID corresponding to a quick answer message to be sent, to the message service server 20. If the message service server 20 receives the MSRP SEND, it performs operations corresponding to steps 411 and 413. Further, in step 233, the message service server 20 sends a 200 OK to the user.

In addition, the user may delete a quick answer message stored on the message service server 20. Thus, in order that the user requests the message service server 20 to delete any quick answer message, as in step 417, the second embodiment of the present invention uses the PUBLISH method, as illustrated in FIG. 9. In FIG. 9, steps 211 correspond to step 417. In step 211, the user requests quick answer deletion by sending a PUBLISH, the body of which carries a quick answer document with the deleted quick answer ID corresponding to a quick answer message to be deleted, to the message service server 20. The message service server 20 retrieves and deletes a quick answer message corresponding to the quick answer ID, which is deleted from the quick answer document included in the PUBLISH, and in step 213, sends a 200 OK as a response to the deletion request.

Figure 12:
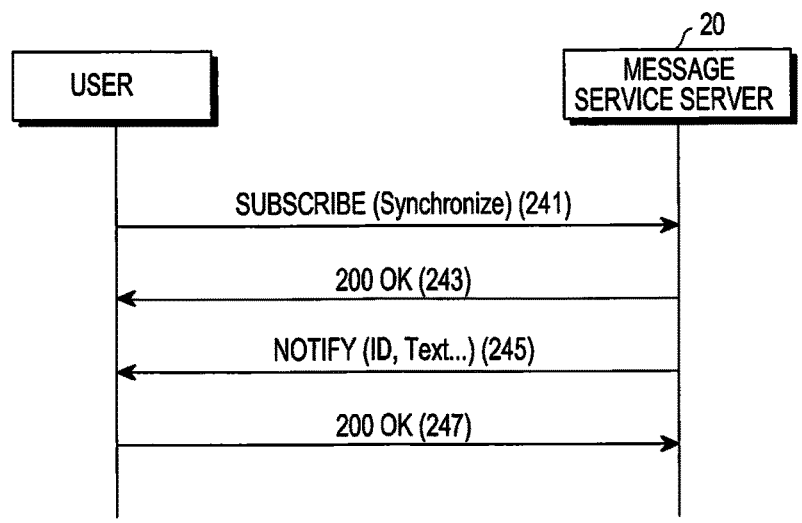
FIG. 12 is a block diagram illustrating a quick answer synchronization step in accordance with the second embodiment of the present invention.

Meanwhile, the user may possess two or more user terminals, and thus when utilizing a new user terminal, the user must perform a synchronization operation in which he/she receives a quick answer list, stored corresponding to the user, from the message service server 20, and stores thereon the received quick answer list. Thus, in order that using the new user terminal, the user requests the message service server 20 to delete any quick answer message, as in step 425, the second embodiment of the present invention uses the SUBSCRIBE and NOTIFY methods, as illustrated in FIG. 12. In FIG. 12, step 241 corresponds to step 425, and step 245 corresponds to step 427. Referring to FIG. 12, in step 241, the user sends a SUBSCRIBE, carrying a quick answer document, to the message service server 20. If the message service server 20 receives the SUBSCRIBE, in step 243, it sends a 200 OK as a receipt acknowledgement, and retrieves a quick answer list stored corresponding to the user. Further, in step 245, the message service server 20 sends a NOTIFY, the body of which carries a quick answer document containing a quick answer ID and quick answer texts contained in the retrieved quick answer list, to the user. In step 247, the user sends a 200 OK as a receipt acknowledgement to the message service server 20. Accordingly, the new user terminal can store thereon an up-to-date quick answer list.

Finally, reference will be made to the third embodiment of the present invention where a quick answer service is implemented using the XCAP GET and XCAP PUT methods.

The third embodiment of the present invention defines a new document, that is, a quick answer document, which is stored on the message service server 20 and contains a quick answer list and an ID associated therewith. A quick answer document is an XML document that must be well-formed and should be valid. Quick answer documents are identified by the MIME type "application/vnd.qamsg+xml". Further, a quick answers document begins with the root element tag <quick-answers>. This tag <quick answers> consists of zero or more <qatext> elements, each one including an "id" attribute that contains a unique identifier associated with the quick answer text for a user. This per-user document resides on the message service server 20, but is managed by the end user himself/herself. The Management of a quick answer document includes create, replace, delete and fetch operations over a document or element or attribute. The methods to perform various operations like create, replace, delete and fetch are defined in the IETF document "The Extensible Markup Language (XML) Configuration Access Protocol (XCAP)" currently in draft stage as "draft-ietf-simple-xcap-07". Further, the third embodiment of the present invention introduces a new feature tag which helps a server to know if a client supports a quick answer feature and also for both sending and receiving systems to uniquely identify a quick answer message. The new feature tag can be called as say "+goma.qamsg". Further, a new MIME type to identify that the SIP method body contains a quick answer message, for example, "application/vnd.qamsg+xml", is contained in a peculiar schema, and schema fields in a quick answer message used in a Send operation contains a quick answer ID.

Reference will now be made to the second embodiment of the present invention, with reference to FIGS. 13 to 16 and FIG. 17. FIGS. 13 to 16 illustrate the types of messages used corresponding to Add/Delete/Send/Synchronize operations of a quick answer service according to the third embodiment of the present invention.

Figure 13:
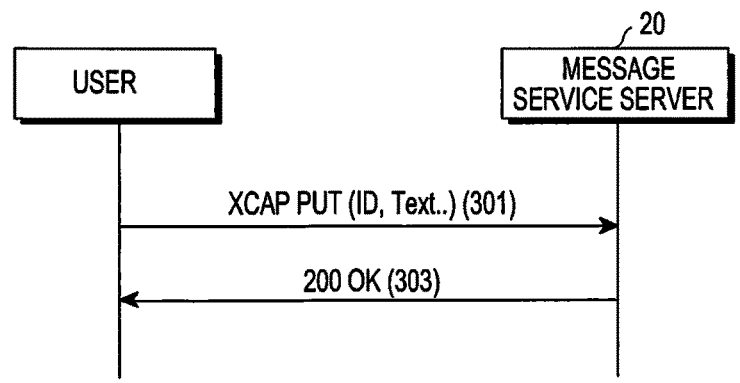
FIG. 13 is a block diagram illustrating a quick answer addition/deletion step in accordance with a third preferred embodiment of the present invention.

The third embodiment of the present invention implements the quick answer addition request in step 401 and the response to the addition request in step 405 by using the XCAP PUT method, which is illustrated in FIG. 13. In FIG. 13, step 301 corresponds to step 401, and step 303 corresponds to step 405. In step 301, the user sends an XCAP PUT, the body of which carries a quick answer document containing a quick answer message, that is, a quick answer ID and a quick answer text, to the message service server 20. Here, the user terminal stores thereon the quick answer document. In step 303, the message service server 20 operates in the same manner as in step 403, and sends a 200 OK as a user addition response.

Figure 14:
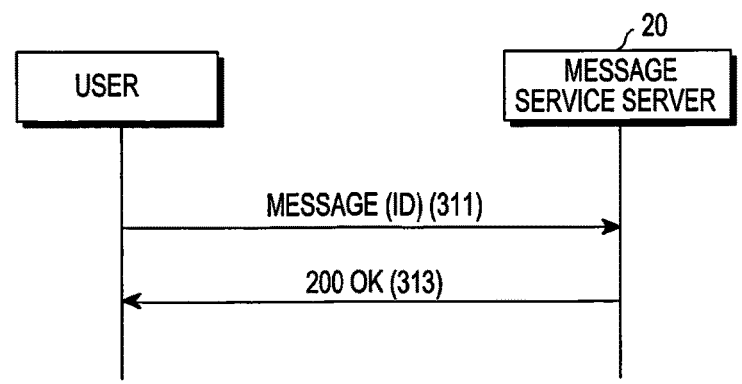
FIG. 14 is a block diagram illustrating a quick answer sending step using a MESSAGE in accordance with the third embodiment of the present invention.
Figure 15:
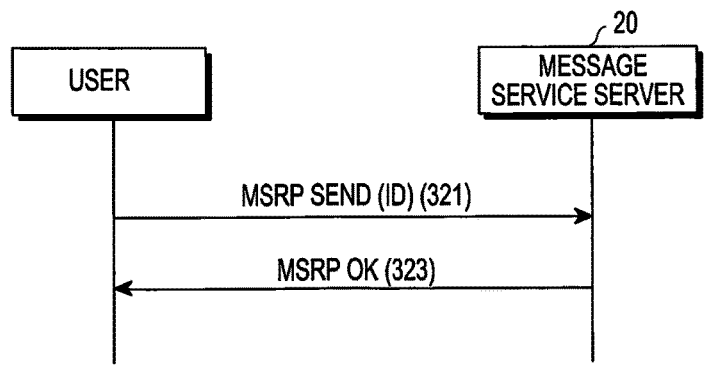
FIG. 15 is a block diagram illustrating a quick answer sending step using an MSRP SEND in accordance with the third embodiment of the present invention.

If a quick answer list is stored on the message service server 20, the user can this quick answer list in message communication. Thus, in order that the user requests the message service server 20 to send a quick answer message, as in step 409, the second embodiment of the present invention uses the MESSAGE or MSRP SEND method, as illustrated in FIG. 14 or 15. In FIG. 14 or 15, steps 311 and 321 correspond to step 409. Referring to FIG. 14, in step 311, the user sends a MESSAGE, the body of which carries a schema field containing a quick answer ID corresponding to a quick answer message to be sent, to the message service server 20. If the message service server 20 receives the MESSAGE, it performs operations corresponding to steps 411 and 413. Further, in step 313, the message service server 20 sends a 200 OK to the user. For the case of using the MSRP SEND, refer to FIG. 15. In step 321, the user sends an MSRP SEND, the body of which carries a schema field containing a quick answer ID corresponding to a quick answer message to be sent, to the message service server 20. If the message service server 20 receives the MSRP SEND, it performs operations corresponding to steps 411 and 413. Further, in step 323, the message service server 20 sends a 200 OK to the user.

In addition, the user may delete a quick answer message stored on the message service server 20. Thus, in order that the user requests the message service server 20 to delete any quick answer message, as in step 417, the second embodiment of the present invention uses the XCAP PUT method where an XCAP PUT carrying a quick answer document with a deleted quick answer is sent to the message service server 20, or uses the method "delete an element" as explained in IETF draft "draft-ietf-simple-xcap-07".

Figure 16:
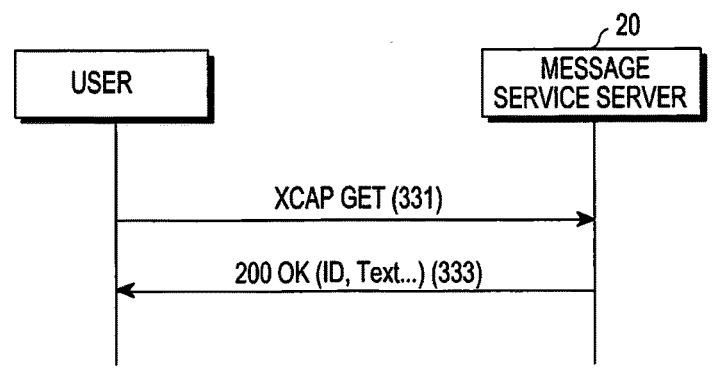
FIG. 16 is a block diagram illustrating a quick answer synchronization step in accordance with the third embodiment of the present invention.

Meanwhile, the user may possess two or more user terminals, and thus when utilizing a new user terminal, the user must perform a synchronization operation in which he/she receives a quick answer list, stored corresponding to the user, from the message service server 20, and stores thereon the received quick answer list. Thus, in order that using the new user terminal, the user requests the message service server 20 to delete any quick answer message, as in step 425, the third embodiment of the present invention uses the XCAP GET method, as illustrated in FIG. 16. In FIG. 16, step 331 corresponds to step 425, and step 333 corresponds to step 427. Referring to FIG. 16, in step 331, the user sends an XCAP GET, carrying a quick answer document, to the message service server 20. If the message service server 20 receives the XCAP PUT, in step 333, it retrieves a quick answer list stored corresponding to the user, and sends a 200 OK, which carries a quick answer document containing a quick answer ID and quick answer texts contained in the retrieved quick answer list, to the user. Accordingly, the new user terminal can store thereon an up-to-date quick answer list.

INDUSTRIAL APPLICABILITY

As described above, the present invention implements a quick answer service, and thus provides a message service method and system which enables a message service user to easily and conveniently transmit messages consisting of frequently used phrases and to provide quick answers to messages received from communication partners. While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

The invention claimed is:

1. A method for providing a quick answer service in a message service server, the method comprising:
receiving, by the message service server, from a sending user terminal, a request message, which requests sending of a quick answer service message to a recipient user terminal;
obtaining a first quick answer text corresponding to a first quick answer ID included in the request message, wherein the first quick answer text is stored in a quick answer list corresponding to a user ID of the sending user terminal;
generating the quick answer service message including the first quick answer text;
sending the quick answer service message to the recipient user terminal; and
if a quick answer synchronization request message is received from the sending user terminal, sending the quick answer list to the sending user terminal,
wherein the quick answer synchronization request message includes at least one of:
tag information indicating the quick answer service message, type information indicating that contents related to the quick answer service are included therein, and a schema field which includes an operation type associated with synchronization of the quick answer list; and
an event package indicating the quick answer service message and a quick answer document which is identified by the type information.

2. The method of claim 1, further comprising:
receiving a quick answer deletion request message from the sending user terminal;
detecting a second quick answer ID in the quick answer deletion request message; and
deleting the second quick answer ID and a second quick answer text corresponding to the second quick answer ID from the quick answer list.

3. The method of claim 2, wherein the quick answer deletion request message is one of a MESSAGE, a SUBSCRIBE, and an XCAP PUT.

4. The method of claim 3, wherein:
the tag information is a feature tag, and the type information is a MIME type;
the MESSAGE includes the feature tag indicating the quick answer service message, the MIME type indicating that contents related to the quick answer service are included therein, and a schema field which is defined by the MIME type and includes an operation type set to "Delete" and the second quick answer ID corresponding to the second quick answer text to be deleted;
the SUBSCRIBE includes an event package indicating the quick answer service message and a quick answer document which is identified by the MIME type and includes all quick answer IDs stored in the user terminal, except the second quick answer ID corresponding to the second quick answer text to be deleted; and
the XCAP PUT includes a quick answer document which is identified by the MIME type and includes all quick answer IDs stored in the user terminal, except the second quick answer ID corresponding to the second quick answer text to be deleted.

5. The method of claim 1, wherein the request message is a MESSAGE or a MSRP SEND.

6. The method of claim 1, wherein,
the request message includes an operation type set to "Send" and the first quick answer ID corresponding to the first quick answer text to be sent.

7. The method of claim 1, wherein the quick answer synchronization request message is one of a MESSAGE, a MSRP SEND, and a SUBSCRIBE.

8. The method of claim 7, wherein:
the tag information is a feature tag, and the type information is a MIME type;
the MESSAGE or the MSRP SEND includes the feature tag indicating the quick answer service message, the MIME type indicating that contents related to the quick answer service are included therein, and a schema field which is defined by the MIME type and includes an operation type set to "Synchronize"; and
the SUBSCRIBE includes an event package indicating the quick answer service message and a quick answer document which is identified by the MIME type.

9. The method of claim 1, further comprising:
receiving a quick answer addition request message from the sending user terminal;
detecting a third quick answer ID in the quick answer addition request message, wherein the quick answer addition request message includes a third quick answer text and the third quick answer ID corresponding to the third quick answer text; and
storing the third quick answer text and the third quick answer ID received from the user terminal in the quick answer list.

10. The method of claim 9, wherein the quick answer addition request message is one of a MESSAGE, a PUBLISH, and an XCAP PUT.

11. The method of claim 10, wherein:
the tag information is a feature tag, and the type information is a MIME type; the MESSAGE includes the feature tag indicating the quick answer service message, the MIME type indicating that contents related to the quick answer service are included therein, and a schema field which is defined by the MIME type and includes an operation type set to "Add" and includes a third quick answer ID and a third quick answer text; and
the PUBLISH includes an event package indicating the quick answer service message, and a quick answer document which is identified by the MIME type indicating that the contents related to the quick answer service are included therein, and includes the third quick answer ID and the third quick answer text.

12. The method of claim 9, wherein storing the third quick answer text and the third quick answer ID comprises:
checking whether or not the quick answer list corresponding to a user of the sending user terminal exists;
detecting the quick answer list if the quick answer list exists, or creating a new quick answer list corresponding to the user if the quick answer list does not exist; and
storing the third quick answer ID and the third quick answer text, included in a MESSAGE, in the quick answer list or the new quick answer list.

13. A method for providing a quick answer service by a user terminal, the method comprising:
composing, by the user terminal, a quick answer text, which comprises content of a quick answer, according to user inputs;

generating, by the user terminal, a quick answer ID corresponding to the quick answer text;

storing, by the user terminal, the quick answer ID and the quick answer text;

sending, from the user terminal, to a message service server, a quick answer addition request message including the quick answer ID and the quick answer text so that the quick answer ID and the quick answer text are stored in a quick answer list corresponding to a user ID of the user terminal in the message service server; and sending, from the user terminal, to the message service server, a request message, which requests sending of a quick answer service message to a recipient user terminal; and sending a quick answer synchronization request message to the message service server, and receiving the quick answer list from the message service server, wherein the quick answer synchronization request message includes at least one of:

tag information indicating the quick answer service message, type information indicating that contents related to the quick answer service are included therein, and a schema field which includes an operation type associated with synchronization of the quick answer list; and an event package indicating the quick answer service message and a quick answer document which is identified by the type information.

14. The method of claim 13, further comprising:

sending a quick answer deletion request message including the quick answer ID, to the message service server, so that the quick answer text corresponding to the quick answer ID is deleted in the message service server.

15. The method of claim 14, wherein quick answer list includes at least one quick answer ID and a quick answer text corresponding to each of the at least one of quick answer ID.

16. A message service server for providing a quick answer service in a message service server, comprising:

a transceiver configured to receive and send one or more messages; and a processor configured to:

receive, from a sending user terminal, through the transceiver, a request message, which requests sending of a quick answer service message to a recipient user terminal, obtain a first quick answer text corresponding to the first quick answer ID included in the request message, wherein the first quick answer text is stored in a quick answer list corresponding to a user ID of the sending user terminal, generate the quick answer service message including the first quick answer text, send the quick answer service message to the recipient user terminal through the transceiver, and if a quick answer synchronization request message is received from the sending user terminal, send the quick answer list to the sending user terminal, wherein the quick answer synchronization request message includes at least one of:

tag information indicating the quick answer service message, type information indicating that contents related to the quick answer service are included therein, and a schema field which includes an operation type associated with synchronization of the quick answer list; and an event package indicating the quick answer service message and a quick answer document which is identified by the type information.

17. The message service server of claim 16, wherein the processor is further configured to receive a quick answer addition request message from the sending user terminal through the transceiver, detect a second quick answer ID in the quick answer addition request message, wherein the quick answer addition request message includes a second quick answer text and the second quick answer ID corresponding to the second quick answer text, and store the second quick answer text and the second quick answer ID received from the user terminal in the quick answer list.

18. The message service server of claim 17, wherein a second quick answer ID included in the quick answer addition request message is associated with a second quick answer text included in the quick answer addition request message.

19. The message service server of claim 18, wherein the processor is further configured to receive a quick answer deletion request message from the sending user terminal through the transceiver, detect a third quick answer ID in the quick answer deletion request message, and delete the third quick answer ID and a third quick answer text corresponding the third quick answer ID from the quick answer list.

20. A user terminal for providing a quick answer service, the user terminal comprising:

a transceiver configured to receive and send one or more messages; and a processor configured to:

compose a quick answer text, which comprises content of a quick answer, according to user inputs, generate a quick answer ID corresponding to the quick answer text, store the quick answer ID and the quick answer text, control the transceiver to send a quick answer addition request message including the quick answer ID and the quick answer text to a message service server so that the quick answer ID and the quick answer text are stored in a quick answer list corresponding to a user ID of the user terminal in the message service server, control the transceiver to send, to the message service server, a request message, which requests sending of a quick answer service message to a recipient user terminal, and control the transceiver to send a quick answer synchronization request message to the message service server, and receive the quick answer list from the message service server, wherein the quick answer synchronization request message includes at least one of:

tag information indicating the quick answer service message, type information indicating that contents related to the quick answer service are included therein, and a schema field which includes an operation type associated with synchronization of the quick answer list; and an event package indicating the quick answer service message and a quick answer document which is identified by the type information.

21. The user terminal of claim 20, wherein the processor is further configured to send a quick answer deletion request message including the quick answer ID, to the message service server, for deleting the quick answer text corresponding to the quick answer ID.

22. The user terminal of claim 20, wherein the processor is further configured to send the quick answer synchronization request message to the message service server, and receive the quick answer list corresponding to the user terminal, the quick answer list comprising at least one quick answer ID and a quick answer text corresponding to each of the at least one quick answer ID.

* * * * *